United States Patent

Couture et al.

[15] 3,642,549

[45] Feb. 15, 1972

[54] ETCHING COMPOSITION INDICATION

[72] Inventors: Roger A. Couture, Richmond; John J. Lajza, Jr., Williston, both of Vt.

[73] Assignee: International Business Machines Corporation, Armonk, N.Y.

[22] Filed: Jan. 15, 1969

[21] Appl. No.: 791,521

[52] U.S. Cl. ....................156/24, 156/15, 156/17, 252/79.3, 252/79.4, 252/408

[51] Int. Cl. ....................C03c 15/00, C09k 3/00, G01n 31/22

[58] Field of Search ....................156/17, 22, 24, 15; 252/79.3, 252/79.4, 408; 23/230 R

[56] References Cited

UNITED STATES PATENTS

| | | | |
|---|---|---|---|
| 3,374,130 | 3/1968 | Junge et al. | 252/79.4 X |
| 3,374,141 | 3/1968 | Junge et al. | 156/24 X |

OTHER PUBLICATIONS

Gajda, IBM Technical Disclosure Bulletin, "Selective Etching of Glass," Vol. 9, No. 11, Apr. 1967, pg. 1476

Kaplan, IBM Tech. Disc. Bull., Protection of Aluminum from HF Etch by Addition of Permanganate, Vol. 9. No. 9. Feb. 1967, pg. 1226

*Primary Examiner*—John T. Goolkasian

*Assistant Examiner*—Joseph C. Gil

*Attorney*—Littlepage, Quaintance, Wray and Aisenberg

[57] ABSTRACT

In the etching through a protective glass coating to expose an underlying metal, overetching is prevented by adding a polyhydric alcohol, for example glycerin, to a glass etchant, which causes a color change on a metal, for example aluminum or molybdenum, indicating that etching through the glass coating has been completed.

18 Claims, No Drawings

ETCHING COMPOSITION INDICATION

BACKGROUND OF THE INVENTION

In the miniaturization of circuits and components, it has become increasingly important to cover the circuits and components with protective coatings. A convenient form of coating the elements is the sputtering of silicon dioxide to form a film over the element. After the film has been formed, it is necessary to make contact holes through the film. One of the most convenient methods for making the contact holes through a film to the element or conductors thereon is etching. Because of the high density of circuits, connectors and components, it is necessary that each of these be as small as possible. Because of the high density and the smallness of the elements, it is extremely important when etching through a protective glass film that the etching be stopped immediately upon reaching the desired connector or contact point. Etchants which etch the glass films are often good etchants for the metals underlying the film. Consequently, overetching risks damaging the contacts and conductors which one seeks to reach. Moreover, even if the contact point or conductor is not damageable by the etchant, etching proceeds laterally as well as inward. Thus, overetching creates a hole through the protective coating far in excess of the size requirement. Overetching exposes additional lateral areas of the underlying element which are not intended to be exposed and which may cause excessive manufacturing rejects or operational failures.

Heretofore, the only reliable method for etching through protective glass films on semiconductor devices has resided in overetching. Time and other parameters for etching would be carefully, empirically determined. Thereupon, etching would be carried out using that precise time plus additional time to insure complete removal of the sputtered glass film in the desired areas. No method has been available for ascertaining when the etching through a glass film to expose an underlying metal is completed.

The prior art solution of overetching is undesirable because it produces bad or unreliable products and because it requires the use of materials of greater size than necessary simply for the operation of the devices. These and other drawbacks of the prior art use of overetching as a method of solving the problem of not knowing when a protective glass film has been completed are well known by those familiar with the art. Etch solutions have been suggested with combined dilute etchants and high concentrations of glycerin in order to further dilute the glass etchants and to prevent the glass etchants from damaging the underlying metal. Such prior art solutions are unacceptable for use with etching with photoresist coatings, because the etchants would destroy the photoresist coating and consequently etch away all of the glass without being selective. Such solutions are used for the complete removal of glass from metal and consequently there is not evidence of marking characteristics. Because such solutions cannot be used with photoresist, they cannot overcome the lateral extension problems of overetching in selective removal of part of a glass coating using photoresists to mask the part of the glass not desired to be etched.

Moreover, because the etchants are diluted and form a small part of the total composition of solution, increased time is required to etch through the protective glass coating.

It is, of course, conventionally recognized that aluminum forms a thin, perhaps monomolecular layer of oxide on its surface. It is also been known that the adhesion of polymeric organic materials to aluminum surfaces by preliminary treatment of the surface, apparently to remove the oxide coating. Prior art has disclosed the wetting of an aluminum surface with nitrosulfonic acid until the aluminum surface is visibly altered. At that time, the surface, apparently, is better able to hold a polymeric organic material. It is recognized that a visible change occurs on the surface of the aluminum, and it appears that this visible change is due to the formation of a thin film of the reaction product.

The prior art has not suggested that any aluminum treatment with components of the solution used in the present method will effect a visible change which is useful. The prior art has not suggested that a visible change on a surface of underlying metal might be a useful indication of the completing of etching through a portion of a protective glass overlayer.

SUMMARY OF THE INVENTION

This invention discloses a method for selectively etching a protective glass film, specifically sputtered silicon dioxide, without damaging the underlying metal and without necessitating overetching in order to insure that the etching of the protective glass layer has been completed. The method is accomplished by employing a glass etchant, preferably hydrofluoric acid, preferably buffered by a saturated aqueous solution of ammonium fluoride and having a low percentage of a polyhydric alcohol.

Using conventional techniques, a semiconductor device is constructed with aluminum, molybdenum or other metallic connectors or contacts. The device is coated with a protective glass film, for example, by sputtering silicon dioxide. The glass film is desirably coated with an adhesion promoter, which is uniformly spread over the glass. A photoresist is then uniformly spread over the adhesion promoter. A mask is placed over the photoresist, the mask having holes at locations where etching is desired, and the photoresist is exposed through the mask to monochromatic light. The mask is removed, and the exposed portions of the photoresist, which have been solubilized if a positive resist is used, are washed away, exposing bare areas of glass. If a negative photoresist is employed, the light acts to insolubilize the those areas of the resist exposed to light, and the unexposed areas of the resist are washed away. An etch solution is then applied to the areas of the glass not covered by photoresist. The etch solution is made up of a glass etchant and a polyhydric alcohol, preferably made up of the following components in volumetric proportions as follows: 25 parts of a saturated aqueous ammonium fluoride solution, 5 parts hydrofluoric acid and 6 parts glycerin. The semiconductor device undergoing etching is carefully observed, and as soon as a color change from a yellowish color to a bright white is noted on the metal underlying the glass, the etch solution is removed from the semiconductor device. The color change is an indicator that etching has been completed. There is no need to overetch to insure that etching is complete.

This invention has as one objective the provision of a method for indicating when etching through a protective glass film to a metal has been completed.

Another objective to this invention is the provision of an indicator for determining when etching through a protective glass film to an underlying metal has been completed.

An additional objective of this invention is the provision of a method for etching through a protective glass film to expose an underlying metal connector or contact, and to provide immediate visual indication of completion of the etching through the glass and of the exposure of the underlying metal.

This invention has as a further objective the provision of an indicating etching process for exposing metal beneath a glass film using a buffered glass etchant in combination with a small amount of polyhydric alcohol.

The foregoing and other objects, features and advantages of the invention will be apparent from the following more particular description of preferred embodiments of the invention.

DETAILED DESCRIPTION

In a preferred embodiment of the invention, an etching solution having a saturated aqueous solution of ammonium fluoride combined with hydrofluoric acid in a ratio in the range of from 7:1 to about 4:1, and having a polyhydric alcohol such as glycerol, ethylene glycol or propylene glycol combined with the hydrofluoric acid and ammonium fluoride solution in a ratio of about 10 to 30 percent are used at a temperature from about 30° to about 70° C. Etching is continued while observing a metal under a glass film, and as soon as a color change is noted on the surface of the metal, the etching is stopped.

In semiconductor devices, vapor-deposited aluminum films are widely used as connectors. Molybdenum is a widely used material for contact points. Since the present invention is concerned with creating access ways through a protective glass film to connectors and contact points, the present invention has particular application to those materials which are most often used for such connectors and contact points. Consequently, the invention has particular application with aluminum and molybdenum connectors and contacts which underlie protective glass films. However, the invention may also be used for other metals under protective glass films, such as copper, chromium, silver, and the like.

Sputtering silicon dioxide is a convenient form of coating semiconductor devices since the coating may be deposited at low temperatures which are compatible with the devices. Sputtered silicon dioxide coatings are uniform and continuous and offer impermeability to those elements which it is desired to keep from contact with the devices. Since silicon dioxide is a widely used protective film for semiconductor devices, and since this invention has primary significance in applications with semiconductor devices, this invention has particular application to the etching of sputtered silicon dioxide films which overly metals.

A preferred embodiment for the preparation of the glass coating prior to etching to expose only those areas intended to be etched, lies in coating the glass with a photoresist which is exposed to monochromatic light in selected areas through a mask. Exposed areas of the photoresist are either rendered soluble or insoluble, depending on whether a positive or negative resist is used, and the soluble areas of the resist are washed away in a conventional manner. The remaining photoresist serves as an insoluble etchant resist for protecting the glass films.

In a preferred application of the invention, semiconductor devices have vacuum-evaporated aluminum conducting lines deposited thereon. The semiconductors and the lines are coated with a protective layer of sputtered silicon dioxide. At points where it is desired to make contact with the aluminum conducting lines, holes through the silicon dioxide, known as via holes, reach the aluminum conducting lines. Stopping the etching operation at the right point is highly critical. If the etching is stopped too soon, no contact will be made with the line. If the etching is stopped too late, that is if an overetching condition exists, the aluminum lines, which are very thin, will be damaged or even completely destroyed by the etching process.

Best results with the etch solution of the present invention are obtained within the range limits described. The 7:1 to 4:1 ratio of saturated aqueous ammonium fluoride solution to hydrofluoric acid is important in order that the pH be controlled throughout the etching operation. Because extremely fine and thin elements are being operated upon, it is very important to control the rate of etching. If the etching proceeds too fast and if not enough buffer is used, too little time will be provided to remove the etch solution after the color change has been noted. Too much buffer solution prevents the etching of the glass or reduces the rate to such a slow rate as to be impractical. It has been found that a ratio of 5 parts by volume of ammonium fluoride solution to 1 part of hydrofluoric acid is the preferred ratio. Too much glycerin will undoubtedly slow the etching process through the glass. It has been found that 1 part of glycerin to 5 parts of the combined hydrofluoric acid and saturated aqueous ammonium fluoride solution is the preferable ratio for these ingredients.

EXAMPLE 1

One example of a process used to remove silicon dioxide over aluminum is as follows. The substrate is a silicon semiconductor wafer having aluminum conducting lines for an array of semiconductor devices overlayed by a sputtered silicon dioxide protective coating.

In order to etch via holes through the silicon dioxide coating to the vapor-deposited aluminum lines on the substrate, the coated semiconductor wafer is coated with a photoresist. Before placing the photoresist on the wafer, the silicon dioxide is covered with a hexamethyl disilazane adhesion promoter to increase the adhesion of photoresist to the silicon dioxide. After applying the adhesion promoter, the semiconductor wafer is spun for 15 seconds at 3,600 r.p.m. to produce a thin even coating of the adhesion promoter. A photoresist is then applied. In this case, the photoresist is a commercially available negative KTFR Photoresist diluted in a ratio of 5 parts of the photoresist to 6 parts of xylene. An analysis of the photoresist indicates that it is a partially cyclized poly-cis-isoprene with a number average molecular weight of 46,000 and a weight average molecular weight of 141,000. After application of the photoresist, the wafer is spun for 15 seconds at 3,600 r.p.m. to give a thin even coating of the photoresist on the coated wafer. Photoresist is cured for 10 minutes at 100° C. prior to exposure to ultraviolet light through a mask to give the photoresist the desired pattern for etching.

The etching operation is then carried out using a buffered etching solution having a saturated aqueous ammonium fluoride solution and reagent grade hydrofluoric acid in a ratio of 5:1 by volume. To that solution glycerin is added in a ratio of 20 percent by volume. Etching is carried out at 50° C., and the etching is continued while observing the wafer. As soon as a white color replaces the original yellowish color of the silicon dioxide coated aluminum in the wafer, etching is stopped. Electrical tests indicate the complete removal of silicon dioxide over the metal and the perfect operation of the semiconductor device. Microscopic examination reveal a complete etching of the silicon dioxide in the desired areas and no attack on the aluminum.

The example is repeated and microscopic examination of the etched product revealed in all cases complete etching of the silicon dioxide with no attack on the aluminum in all cases where etching is stopped as soon as the color change is observed. In all cases of metals used in semiconductor devices, the indicator effect is observed and subsequent examination reveals complete etching of the silicon dioxide with no attack on the underlying metal.

EXAMPLE 2

In another example identical steps were taken in preparing a wafer with an adhesion promoter and exposed and developed photoresist coating. The ratio of saturated aqueous ammonium fluoride solution and reagent grade hydrofluoric acid is increased to 7:1. The results observed are identical with the results of the first test.

EXAMPLE 3

A wafer was prepared for etching as in the first example. An etching is carried out, using an etch solution having a ratio of 4 parts by volume of a saturated aqueous ammonium fluoride solution and 1 part of hydrofluoric acid. Glycerin is added to that solution in a ratio of 20 percent with respect to the combined hydrofluoric acid and ammonium fluoride solution. This is identical to the result in Example 1.

EXAMPLE 4

Several wafers are prepared as described in Example 1. The wafers are divided into groups. One group of wafers is treated with an etched solution comprising a saturated aqueous ammonium fluoride solution and reagent grade hydrofluoric acid in a ratio of 7:1. To this solution there is added 10 percent by volume of glycerin. Another group of wafers is treated with an etch solution having a 7:1 ammonium fluoride solution to hydrofluoric acid ratio and glycerin in a relationship of 30 percent to the remainder of the solution. Two other groups of wafers are etched with solutions, respectively comprising 8 parts saturated aqueous fluoride solution, 2 parts hydrofluoric acid and 1 part glycerin by volume, and comprising 8 parts saturated aqueous fluoride solution, 2 parts hydrofluoric acid and 3 parts glycerin by volume. Etching is carried out on individual wafers at temperatures within the ranges of 30° to 70° C. A color change indication is found in each of the specimens and etching is terminated immediately upon observing the color change. Each specimen shows a completely etched silicon dioxide coating with aluminum connecting lines free from attack.

EXAMPLE 5

In a further example, wafers are prepared in the same manner as described in Example 1, with the exception that molybdenum provides contact points on the semiconductor devices beneath the sputtered silicon dioxide coating. An etching process similar to that in Example 1 is carried out and etch solutions having varied volumetric proportions over the ranges discussed in the previous examples are employed at temperatures varied between 30° and 70° C. As soon as color changes on the molybdenum are noted, etching is stopped. Electrical tests and microscopic examinations of the wafers reveal complete etching of the via holes through the silicon dioxide film without attack on the molybdenum and without widening of the holes through overetching.

EXAMPLE 6

Wafers are prepared as described in the preceding examples and etching is carried out as described therein with the exception that another polyhydric alcohol, ethylene glycol replaces the glycerol, or glycerin, used in the previous examples. Etching is carried out with etch solutions varied over the volumetric proportional ranges of ingredients indicated in the previous examples. As soon as a color change is noted on the surface of the metal underlying the silicon dioxide coatings, etching is stopped. Electrical and microscopic examination of the etched wafers indicate complete etching of the silicon dioxide film and no attack on metals beneath the film.

EXAMPLE 7

Preparations and etching are carried out with a number of wafers substituting another polyhydric alcohol, propolene glycol, for the ethylene glycol and glycerol of the previous examples, throughout the ranges of volumetric proportions of ingredients in etch solutions. Indicator color changes are noted in each case, and etching is stopped immediately upon observing the color changes. Electrical and microscopic examinations reveal complete etching of the silicon dioxide film and no attack on underlying metals, including vapor deposited aluminum connecting lines and molybdenum contacts.

To allow maximum observable color change, the use of a transparent photoresist is desirable and the spreading of a thin and uniform coating of an adhesion promoter and of photoresist are highly desirable to the accomplishment of the objectives of the etching method of this invention.

While the invention has been particularly shown and described with reference to preferred embodiments thereof, it will be understood by those skilled in the art that various changes in form and details may be made therein without departing from the spirit and scope of the invention.

What is claimed is:

1. The method of etching through a glass coating to expose an underlying metal without overetching comprising the sequential steps of:
   - selectively covering a glass coating on a metal with a resist;
   - contacting the uncovered areas of the glass coating with an etch solution having in combination hydrofluoric acid, a buffering agent and a polyhydric alcohol;
   - continuing the contacting thereby etching through the glass coating, in the predetermined areas,
   - observing a color change on a metal underlying the glass coating;
   - removing the etch solution from the glass coating and from the metal upon observing the color change on the metal.

2. The method of etching of claim 1 wherein the underlying metal is selected from the group of metals consisting of aluminum and molybdenum.

3. The method of etching of claim 1 wherein the contacting step comprises contacting the exposed areas with an etch solution having hydrofluoric acid and a polyhydric alcohol selected from the group consisting of glycerol, ethylene glycol and propylene glycol.

4. The method of claim 1 wherein the contacting step comprises contacting the exposed areas with an etch solution having hydrofluoric acid and glycerol.

5. The method of claim 1 wherein the contacting step comprises contacting the exposed areas with a buffered etch solution containing a buffering salt, hydrofluoric acid and a polyhydric alcohol.

6. The method of claim 1 wherein the contacting step comprises contacting the exposed areas with a buffered etch solution containing ammonium fluoride, hydrofluoric acid, and a polyhydric alcohol.

7. The method of claim 1 wherein the contacting step comprises contacting the exposed areas with a buffered etch solution containing ammonium fluoride, hydrofluoric acid, and glycerin.

8. The method of claim 1 wherein the contacting step comprises contacting the exposed areas with a buffered etch solution containing a saturated ammonium fluoride solution and reagent grade hydrofluoric acid in a ratio in the range of about 7:1 to 4:1 by volume and containing glycerin in a range of about 10 to 30 percent by volume with respect to the combined ammonium fluoride solution and hydrofluoric acid.

9. The method of etching of claim 8 wherein the contacting step is carried out at a temperature in the range of about 30° to about 70° C.

10. The method of etching of claim 1 wherein the contacting step comprises contacting the exposed areas with a buffered etch solution comprising a saturated ammonium fluoride solution and reagent grade hydrofluoric acid combined in a ratio of about 5:1 by volume and containing glycerin at about 20 percent by volume compared to combined hydrofluoric acid and ammonium fluoride solution at a temperature of about 50° C.

11. The method of etching of claim 1 wherein the removing step comprises removing the etch solution immediately upon observing a change from a yellowish color to a bright white color appearing on the metal.

12. The method of constructing a glass-coated semiconductor element having a metal underlying a glass coating and having contact portions of the metal exposed through a glass coating comprising the sequential steps of:
   - providing a semiconductor wafer,
   - placing a metal conductor on the wafer,
   - coating the wafer and the conductor with a protective glass film,
   - coating the glass film with a photoresist,
   - exposing preselected portions of the photoresist through a mask with a light source,
   - washing away soluble portions of the photoresist, thereby baring preselected surface areas of the glass film,
   - contacting the photoresist and bare areas of the glass film with an etch solution having hydrofluoric acid and a buffering agent in combination with a polyhydric alcohol as a indicator,
   - continuing the contacting, and, hence, etching the glass, observing a color change of the metal underlying the glass film, and
   - removing the etch solution upon observing the color change of the metal.

13. The method of constructing a glass-coated semiconductor of claim 12, wherein the placing step comprises placing a conductor on the wafer the conductor being a metal selected from the group of metals consisting of aluminum and molybdenum.

14. The method of constructing a glass-coated semiconductor of claim 13 wherein the sequential steps respectively comprise:

providing a silicon semiconductor wafer, placing an aluminum conductor on the wafer, coating the conductor and wafer by sputtering a silicon dioxide film on the wafer and conductor, coating the sputtered silicon dioxide film with an adhesion promoter, and coating the adhesion promoter with a photoresist, exposing preselected portions of the photoresist with light through a mask from a light source, washing away soluble portions of the photoresist, thereby baring predetermined surface areas of the silicon dioxide film, contacting the photoresist and bare areas of the silicon dioxide film with a buffered etch solution comprising a saturated aqueous ammonium fluoride solution and hydrofluoric acid in a volumetric ratio of about 7:1 to about 4:1, in combination with glycerin in a concentration of about 10 to 30 percent by volume with respect to the combined hydrofluoric acid and ammonium fluoride solution, continuing the contacting step, and, hence, etching the silicon dioxide film, and observing the aluminum underlying the film, removing the etch solution immediately upon observing a color change from yellowish to bright white on the aluminum.

15. In the etching of a protective glass coating over a metal to expose the metal, the improvement comprising applying an etching solution containing hydrofluoric acid, a buffering agent and about 10 to 30 percent by volume of polyhydric alcohol to thereby indicate the glass has been etched through by observing a color change on the metal immediately upon the etching solution reaching the metal.

16. The use of a polyhydric alcohol for indicating etching completion of claim 15 wherein the etching solution comprises hydrofluoric acid, and wherein the polyhydric alcohol is selected from the group consisting of glycerol, ethylene glycol and propylene glycol.

17. The use as described in claim 16 wherein the etching solution further comprises ammonium fluoride as a buffering agent.

18. The use as described in claim 17 wherein the etching solution comprises a saturated aqueous ammonium fluoride solution combined with reagent grade hydrofluoric acid in a volumetric ratio in the range of from about 7:1 to 4:1, and wherein the polyhydric alcohol is combined in about 20 percent by volume with respect to the combined hydrofluoric acid and ammonium fluoride solution.

* * * * *

PO-1050
(5/69)

UNITED STATES PATENT OFFICE
CERTIFICATE OF CORRECTION

Patent No. 3,642,549 Dated February 15, 1972

Inventor(s) Roger A. Couture & John J. Lajza, Jr.

It is certified that error appears in the above-identified patent and that said Letters Patent are hereby corrected as shown below:

The correct title of this patent should read:

ETCHING COMPLETION INDICATION

Signed and sealed this 26th day of September 1972.

(SEAL)
Attest:

EDWARD M.FLETCHER,JR.
Attesting Officer

ROBERT GOTTSCHALK
Commissioner of Patents